US008364692B1

(12) United States Patent
Allen et al.

(10) Patent No.: US 8,364,692 B1
(45) Date of Patent: Jan. 29, 2013

(54) IDENTIFYING NON-DISTINCT NAMES IN A SET OF NAMES

(75) Inventors: Thomas B. Allen, Henderson, NV (US); Brian E. Macy, Henderson, NV (US); Caroljayne J. Vincent, Las Vegas, NV (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/208,189

(22) Filed: Aug. 11, 2011

(51) Int. Cl.
*G06F 17/30* (2006.01)

(52) U.S. Cl. ........................................... 707/758

(58) Field of Classification Search .................. 707/728, 707/749, 758, 780
See application file for complete search history.

(56) References Cited

U.S. PATENT DOCUMENTS

| | | | | |
|---|---|---|---|---|
| 6,370,547 | B1 * | 4/2002 | Eftink | 1/1 |
| 6,636,850 | B2 * | 10/2003 | Lepien | 707/780 |
| 6,985,926 | B1 * | 1/2006 | Ferlauto et al. | 709/206 |
| 7,403,942 | B1 * | 7/2008 | Bayliss | 707/748 |
| 7,599,921 | B2 | 10/2009 | Biesenbach et al. | |
| 8,166,033 | B2 * | 4/2012 | Kazi et al. | 707/737 |
| 2004/0243588 | A1 * | 12/2004 | Tanner et al. | 707/100 |
| 2005/0084152 | A1 | 4/2005 | McPeake et al. | |
| 2008/0091674 | A1 | 4/2008 | Allen et al. | |
| 2009/0282039 | A1 | 11/2009 | Diamond | |

OTHER PUBLICATIONS

Cohen, W.W., P. Ravikumar, and S.E. Fienberg, "A Comparison of String Metrics for Matching Names and Records", © 2003, American Association for Artificial Intelligence, (Also KDD Workshop on Data Cleaning and Object Consolidation, http://citeseerx.ist.psu.edu/viewdoc/sum), Total 6 pp.

Das, J. and P.L. Choong, "Resolving Partial Name Mentions Using String Metrics", © Commonwealth of Australia 2007, Defence Science and Technology Organisation, Edinburgh (Australia), Command, Control, Communications, and Intelligence Division, Report No. DSTO-RR-0318; DODA-AR-014-065, Total 40 pp.

IBM Corp., "Name Distinctiveness as an Entity Resolution Driver", IPCOM000179653D, Feb. 20, 2009, Total 2 pp.

Top, P., F. Dowla, and J. Gansemer, "A Dynamic Programming Algorithm for Name Matching", Proceedings of the 2007 IEEE Symposium on Computational Intelligence and Data Mining (CIDM 2007), © 2007 IEEE, Digital Object Identifier: 10.1109/CIDM.2007. 368923, Total 5 pp.

Wikipedia, "Jaro-Winkler Distance", [online], [Retrieved on Aug. 11, 2011]. Retrieved from the Internet at <URL: http://en.wikipedia.org/wiki/Jaro-Winkler_distance>, Total 5 pp.

Yancey, W.E., "Evaluating String Comparator Performance for Record Linkage", Report Issued: Jun. 13, 2005, [online]. Retrieved from the Internet at <URL: http://www.census.gov/srd/papers/pdf/rrs2005-05.pdf, (Also Bureau of the Census), Total 42 pp.

US 6,993,519, 01/2006, Hermansen et al. (withdrawn)

* cited by examiner

*Primary Examiner* — Cam-Linh Nguyen
(74) *Attorney, Agent, or Firm* — Janaki K. Davda; Konrad, Raynes, Davda & Victor LLP

(57) ABSTRACT

Non-distinct names are identified in a set of names. The set of names is obtained for a first entity. In response to comparing a first name and a second name in the set of names, it is determined that the first name is similar to the second name. Initials in the first name and the second name are searched for. In response to the search indicating that there is at least one initial in at least one of the first name and the second name, it is determined that the at least one initial matches a corresponding initial in another one of the first name and the second name and one of the first name and the second name are marked as a non-distinct name. A cross-entity scoring technique using distinct names in the set of names for the first entity and names in another set of names for a second entity is applied.

21 Claims, 6 Drawing Sheets

400

Comparing 0: JOHN BRIAN SMITH [16 chars] to 0: JOHN SMITH [10 chars]
commonRangeRadius=8
Commoncount=6
Post-Transposition check Common count=10
TranspositionCount=1
Marking JOHN SMITH generic.

FIG. 4

IDENTIFYING NON-DISTINCT NAMES IN A SET OF NAMES

BACKGROUND

Embodiments of the invention relate to identifying non-distinct names in a set of names.

Entity resolution (or identity disambiguation) techniques may be used to determine when two or more entities (e.g., people, buildings, places, organizations, documents, cars, things, other objects, etc.) represent the same physical entity despite having been described differently. Sometimes these techniques are called de-duplication, match/merge, identity resolution, semantic reconciliation, or have other names. For example, a first record containing CustID#1 [Bob Jones at 123 Main Street with a Date of Birth (DOB) of Jun. 21, 1945] is likely to represent the same entity as a second record containing CustID#2 [Bob K Jones at 123 S. Main Street with a DOB of Jun. 21, 1945]. Entity resolution can be used within a single data source to find duplicates, across data sources to determine how disparate transactions relate to one entity, or used both within and across a plurality of data sources at the same time.

Entity resolution products may be provided with data sets that contain an array of identity data. However, there are many data sets whose chief identifying attribute is a name. For any entity, there may be multiple names that represent that entity, some of which are less distinct than others. A name that is a distinct representation of an entity is one that increases understanding or provides greater context of the identity. A name may include one or more of: a surname or initial, a middle name or initial, a given name or initial, etc.

The following is an example in which Entity 1 has three names (i.e., representations of Entity 1), while Entity 2 has two names (i.e., representations of Entity 2).

| ENTITY 1: | ENTITY 2: |
|---|---|
| JOHN B. SMITH | JOHN DAVID SMITH |
| JOHN BRIAN SMITH | PETE THOMPSON |
| JOHN SMITH | |

Multiple names for a single entity may be known to be associated with that single entity based on various matching features (e.g., same social security number for each of the names). Thus, JOHN DAVID SMITH and PETE THOMPSON are known to be associated with Entity 2, although the names appear to be different. The name JOHN SMITH in Entity 1 is an obvious, non-distinct, duplicative representation of every other name in Entity 1. The name JOHN SMITH does not add any context or understanding of the names in Entity 1. Further, the name JOHN SMITH in Entity 1 could also be a non-distinct representative of the name JOHN DAVID SMITH in Entity 2.

In attempting to determine the likeness of the names in the two entities, an entity resolution system may perform a cross-entity scoring technique, which performs a pair-wise comparison of the cross product of the names (e.g., in each pair of names compared, one name is from Entity 1 and the other name is from Entity 2) and generates a score for each pair of names, which might result in the following:

| | |
|---|---|
| JOHN DAVID SMITH vs. JOHN B. SMITH: | 80% |
| JOHN DAVID SMITH vs. JOHN BRIAN SMITH: | 80% |
| JOHN DAVID SMITH vs. JOHN SMITH: | 90% |
| PETE THOMPSON vs. JOHN B. SMITH: | 2% |

-continued

| | |
|---|---|
| PETE THOMPSON vs. JOHN BRIAN SMITH: | 2% |
| PETE THOMPSON vs. JOHN SMITH: | 2% |

The highest score in this example results from the comparison to the name that is the least distinct representation of Entity 1 (JOHN SMITH). While this may be a legitimate score, this score does not accurately represent how alike or how different the names are in the entities. Rather, the highest score indicates that these entities are very much alike, when in fact, they have some significant conflicts (middle name). Similarly, the lowest score is generated from comparing very different names (PETE THOMSON). Again, this low score is legitimate, but the lowest score may not accurately reflect the likeness between the names in the two entities. Even if an entity resolution system used an average of the scores, rather than a highest or lowest score, to make decisions about the likeness of these names based on these scores, the result would most likely be skewed higher.

Some systems may take a statistical approach, in which the cardinality of a given name is directly correlated to the number of instances in the data set. This approach may assume an unbiased data set, may assume no knowledge about the true distinctiveness of a name, and may rely solely on its occurrence within a given data set. Also, this approach may assume a training set consisting of the entirety of the world's names. Some systems may take an approach of survivorship. Survivorship is the process of reducing each entity down to only the best elements. In such systems, an Entity would not contain multiple names because survivorship rules would reduce a list of names to one name. Typically, survivorship rules are simple rules (e.g., longest strings or most words).

SUMMARY

Provided are a method, computer program product, and system for identifying non-distinct names in a set of names. The set of names is obtained for a first entity. In response to comparing a first name and a second name in the set of names, it is determined that the first name is similar to the second name. Initials in the first name and the second name are searched for. In response to the search indicating that there is at least one initial in at least one of the first name and the second name, it is determined that the at least one initial matches a corresponding initial in another one of the first name and the second name and one of the first name and the second name are marked as a non-distinct name. A cross-entity scoring technique using distinct names in the set of names for the first entity and names in another set of names for a second entity is applied.

BRIEF DESCRIPTION OF THE SEVERAL VIEWS OF THE DRAWINGS

Referring now to the drawings in which like reference numbers represent corresponding parts throughout:

FIG. 4 illustrates, in a block diagram, a score log from the prototype for the comparison of names in accordance with certain embodiments.

DETAILED DESCRIPTION

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Figure 1:
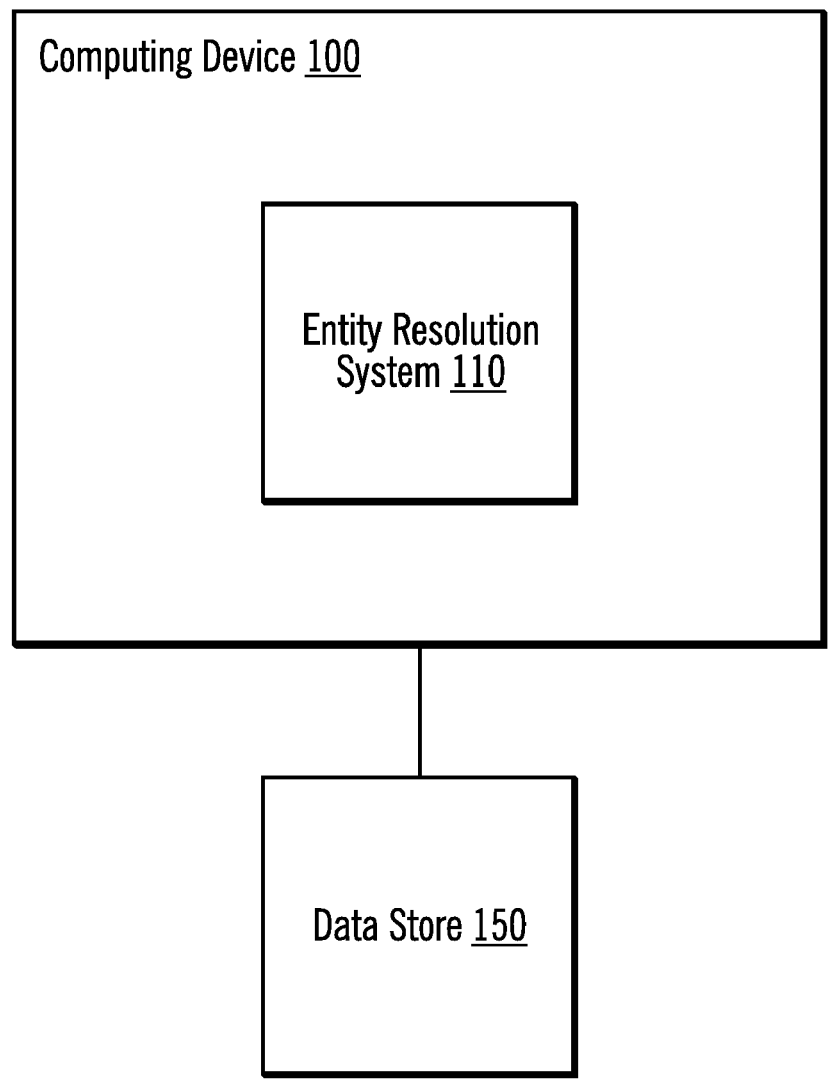
FIG. 1 illustrates, in a block diagram, a computing device in accordance with certain embodiments.

FIG. 1 illustrates, in a block diagram, a computing device 100 in accordance with certain embodiments. The computing device 100 includes an entity resolution system 110. The computing device 100 is coupled to a data store 150. The data store 150 stores multiple names for multiple entities (e.g., people, buildings, places, organizations, documents, cars, things, other objects, etc.).

In certain embodiments, the data store 150 is a database. Relational databases are computerized information storage and retrieval systems. Relational databases are organized into tables that consist of rows and columns of data. The rows may be called tuples or records or rows. A database typically has many tables, and each table typically has multiple records and multiple columns.

The entity resolution system 110 obtains multiple names for a single entity. The entity resolution system 110 compares two names for an entity (e.g., two names for Entity 1) and determines whether one of the two names is a less-distinct version of the other name. In certain embodiments, the entity resolution system 110 does not rely on any name data archive/global data source, cultural information or parse data. For example, with reference to Entity 1, if the least-distinct names (JOHN SMITH, JOHN B. SMITH) were omitted from the analysis, the resultant cross-entity scoring would more accurately represent the likenesses or the differences in the names, and the decisions by the entity resolution system 110 based on these scores would result in a higher quality analysis. For example, the highest score would then accurately represent the highest level of matching between the names in the entities which contribute the highest fidelity data; while the lowest score would accurately represent the most conflict; and the average would not be skewed higher because the average would be based on the names which provide the most, non-generic information about the entity.

The entity resolution system 110 provides the ability to limit evaluation or cross-entity scoring to only the distinct names that representation an entity, and this results in more accurate analytic results. Inclusion of less-distinct names is more likely to result in a skewed analysis of the similarities of the names in each entity.

The entity resolution system 110 evaluates each given name within a local space to determine the set of distinct names that will provide the most accurate results within an entity resolution framework. That is, the entity resolution system 110 compares names for a single entity against other names for that same entity. That is, at this point, the entity resolution system 110 does not look at other entities. Thus, this is a single entity (with multiple names representing that single entity) process.

Figure 2A:
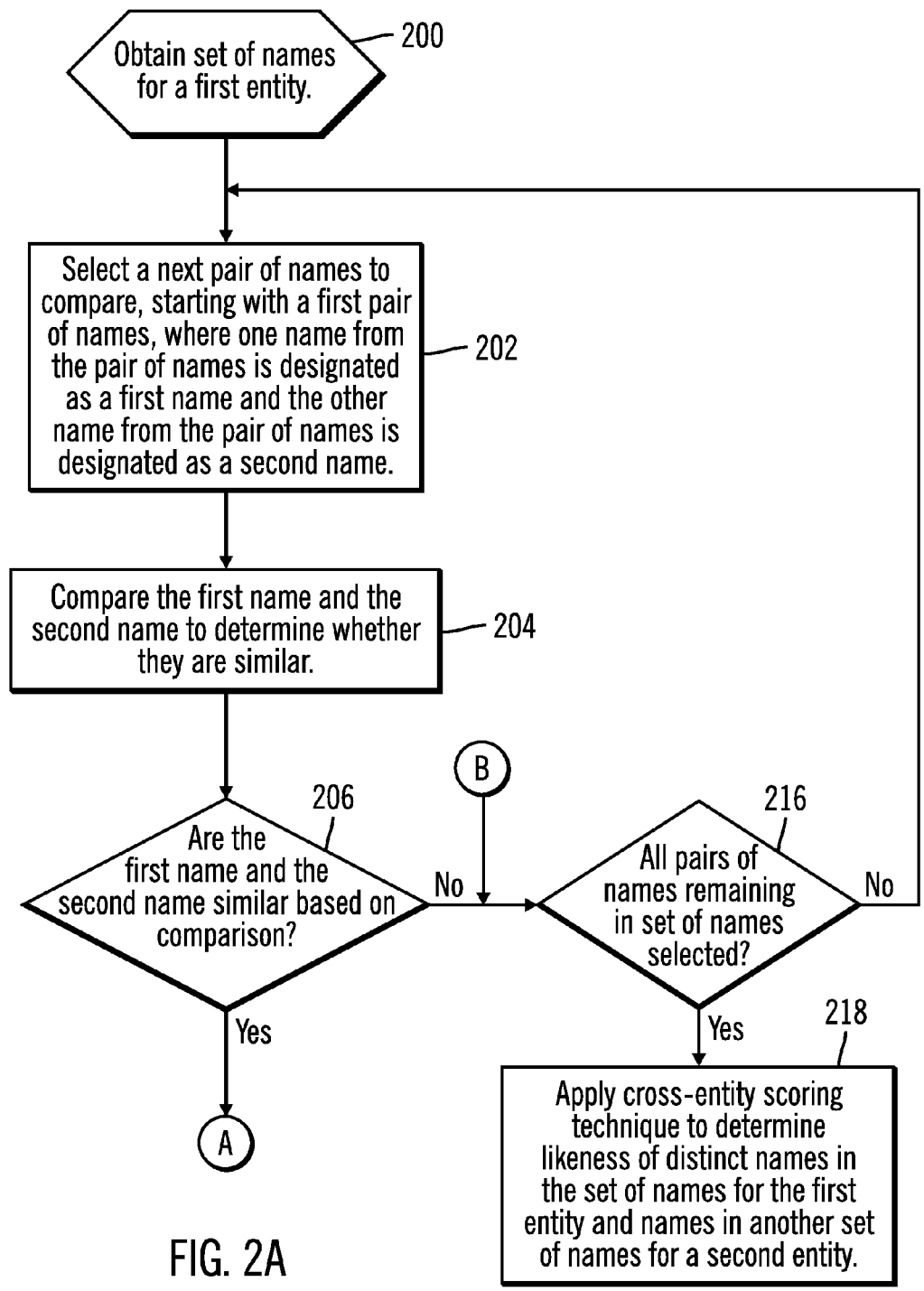
FIGS. 2A and 2B illustrated, in a flow diagram, logic performed by the entity resolution system to detect distinct names in a set of entities in accordance with certain embodiments.
Figure 2B:
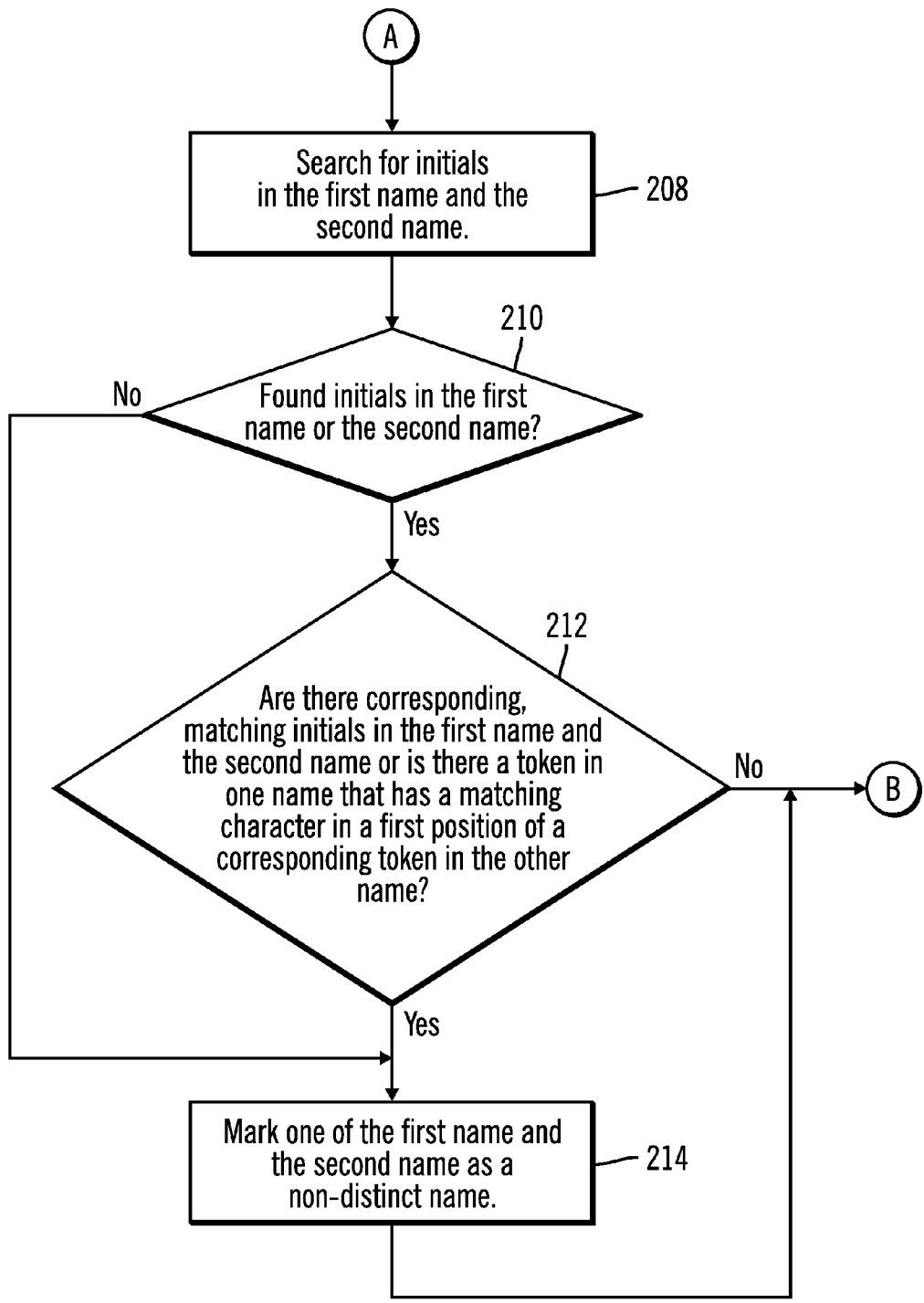

FIGS. 2A and 2B illustrated, in a flow diagram, logic performed by the entity resolution system 110 to detect distinct names in a set of names for an entity in accordance with certain embodiments. Control begins at block 200 with the entity resolution system 110 obtaining a set of names for a first entity. The set of names may be described as including multiple names that represent a single entity. In certain embodiments, the set of names are known to be associated with the first entity based on various matching features (e.g., same social security number for each of the names).

The following is an example in which Entity 1 has three names.

ENTITY 1:
JOHN B. SMITH
JOHN BRIAN SMITH
JOHN SMITH

In block 202, the entity resolution system 110 selects a next pair of names to compare from the set for the first entity, starting with a first pair of names, where one name from the pair of names is designated as a first name and the other name from the pair of names is designated as a second name. For example, a first name of "JOHN B SMITH" is compared to a second name of "JOHN BRIAN SMITH".

Figure 3:
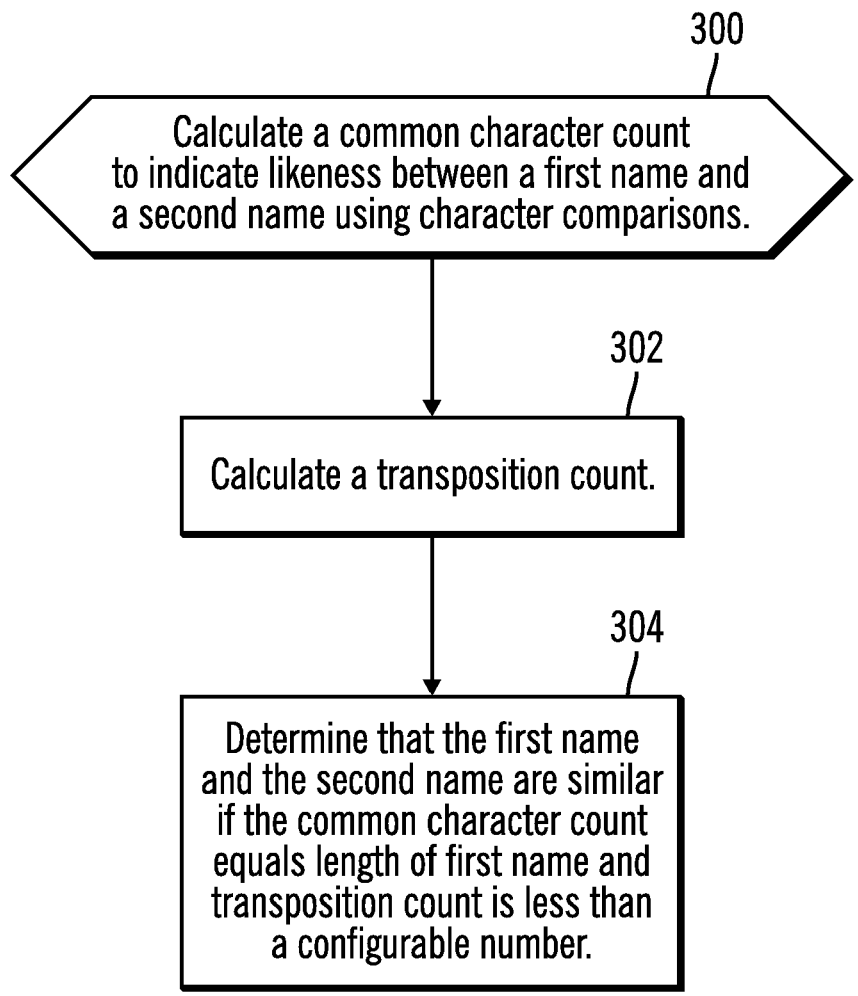
FIG. 3 illustrates, in a flow diagram, logic performed by the entity resolution system to determine whether a first name and a second name are similar in accordance with certain embodiments.
Figure 5:
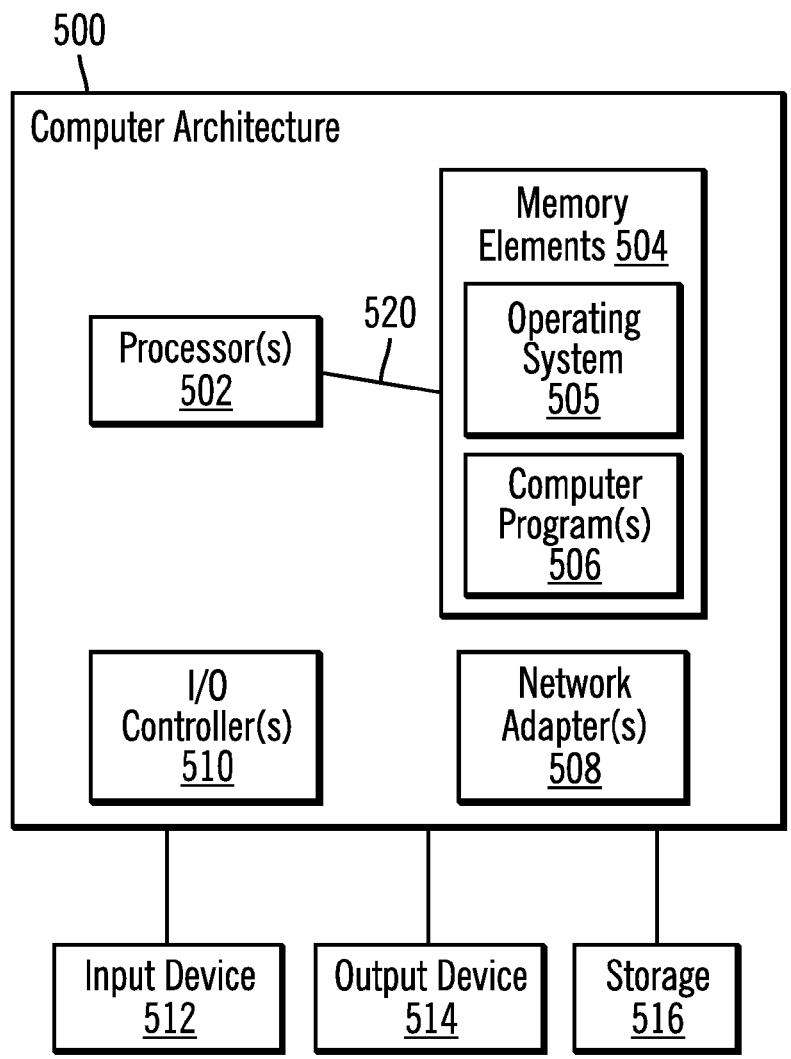
FIG. 5 illustrates, in a block diagram, a computer architecture that may be used in accordance with certain embodiments.

In block 204, the entity resolution system 110 compares the first name and the second name to determine whether they are similar. In block 206, the entity resolution system 110 determines whether the first name and the second name are similar based on the comparison. FIG. 3 provides additional details for performing this determination in accordance with certain embodiments. If the first name and the second name are similar, processing continues to block 208 (FIG. 2B), otherwise, processing continues to block 216. In certain embodiments, the determination that two names are similar is based on determining that all characters of one name are included in the second name (i.e., the two names match).

In certain embodiments, the entity resolution system 110 marks (i.e., designates) the one of the names in the pair (e.g., JOHN SMITH) as a candidate, non-distinct name. That is, if two names are found to be similar, then one name may be a non-distinct version of the other name.

In block 208, the entity resolution system 110 searches for initials in the first name and the second name. In block 210, the entity resolution system 110 determines whether initials were found in the first name or the second name. If so, processing continues to block 212, otherwise, processing continues to block 214. That is, the entity resolution system 110 evaluates the first name and the second name for the presence of any initials. This is to prevent names, such as MARY T. JONES, being considered non-distinct representations of MARY ELIZABETH JONES and to allow for MARY E. JONES to be considered a less distinct version of MARY ELIZABETH JONES. If initials are not present in either the first name or the second name, processing continues to block 214.

In block 212, the entity resolution system 110 determines whether there are corresponding, matching initials in the first name and the second name (e.g., trying to match "T" in MARY T. JONES with "E" in MARY E. JONES) or whether there is a token in one of the names in the pair (i.e., in the first name or the second name) that has a matching character in a first position of a corresponding token in the other one of the names in the pair (e.g., trying to match "B" in with "Brian"). If so, processing continues to block 214, otherwise, processing continues to block 216 (FIG. 2A). That is, in response to the search indicating that there is at least one initial in at least one of the first name and the second name, the entity resolution system 110 determines whether the at least one initial in the at least one of the first name and the second name matches a corresponding initial in the other one of the first name and the second name.

In block 214, the entity resolution system 110 marks one of the names as a non-distinct name. The name that is marked is a less-distinct version of the other name in the pair of names. In certain embodiments, if the entity resolution system 110 marked one of the names as a candidate, non-distinct name, the entity resolution system 110 changes the marking of the that name from candidate, non-distinct name to non-distinct name. Thus, the entity resolution system 110 updates the set of names by marking the first name as non-distinct in the set of names so as to exclude the first name from the cross-entity scoring technique. Names in the set that are not marked as non-distinct are considered to be distinct names. In certain embodiments, the entity resolution system 110 may mark some names as distinct. From block 214, processing continues to block 216 (FIG. 2A).

Thus, if the first name and the second name are found to be similar and there are no initials found in the first name or the second name, the entity resolution system 110 determines that one name is a non-distinct representation of the other name. Also, if the first name and the second name are found to be similar and initials are found in the first name or the second name, the entity resolution system 110 determines that the first name is a non-distinct representation of the second name if there are corresponding matching initials or if a token in one name has a matching character in the first position of that token in the other name.

In block 216, the entity resolution system 110 determines whether all pairs of names remaining in the set of names have been selected. In certain embodiments, a name marked as non-distinct is not selected as a name in a subsequent selection of another pair of names. If so, processing continues to block 218, otherwise, processing loops back to block 202 to select another pair of names.

In block 218, the entity resolution system 110 applies a cross-entity scoring technique to determine the likeness of distinct names in the set of names for the first entity and names in another set of names for a second entity. As mentioned above, names in a set that are not marked as non-distinct are treated as distinct. These distinct names are used by the cross-entity scoring technique. That is, this updated set does not include non-distinct names. The cross-entity scoring technique performs a pair-wise comparison of the cross product of the names (e.g., in each pair of names compared, one name is from Entity 1 and the other name is from Entity 2) and generates a score for each pair of names.

In this manner, the entity resolution system 110 uses the common character count, the transposition count, and initials to determine distinctiveness between two names.

The entity resolution system 110 applies these techniques on sets of names prior to any cross-entity scoring technique. Then, the entity resolution system 110 obtains more accurate scores by applying the cross-entity scoring technique on the resultant set of names that contains only distinct names (than the original set obtained in block 200).

By applying these techniques on Entity 1 and Entity 2, prior to scoring the names in each entity, the newly created set of distinct names to be scored becomes:

| ENTITY 1: | ENTITY 2: |
|---|---|
| JOHN BRIAN SMITH | JOHN DAVID SMITH |
|  | PETE THOMPSON |

The following is an example result of applying a cross-entity scoring technique (in block 218) based on the set of distinct names:

| JOHN DAVID SMITH vs. JOHN BRIAN SMITH: | 80% |
|---|---|
| PETE THOMPSON vs. JOHN BRIAN SMITH: | 2% |

When non-distinct names are not used, the cross-entity scoring technique performs two pair-wise comparisons (instead of six pair-wise comparisons). In this example, the high and average scores more accurately represent the likeness between the names in the two entities while the low score remains unchanged.

Also, the entity resolution system 110 has improved application performance as fewer name pairs will likely go through any expensive computational cross-entity scoring technique.

FIG. 3 illustrates, in a flow diagram, logic performed by the entity resolution system to determine whether a first name and a second name are similar in accordance with certain embodiments. Control begins at block 300 with the entity resolution system 110 calculating a common character count to indicate likeness between the first name and the second name in a pair of names for a single entity using character comparisons.

In certain embodiments, the entity resolution system 110 employs a Jaro-Winkler distance technique to perform character comparisons between the first name and the second name. The goal of the Jaro-Winkler distance technique is to calculate a common character count (i.e., a score) to indicate likeness between two names.

In certain embodiments, the entity resolution system 110 uses a portion of the Jaro-Winkler distance technique to perform character comparisons, but the entity resolution system 110 does not use any of the scoring performed by the Jaro-Winkler distance technique to determine distinctiveness of names The entity resolution system 110 is unique from the Jaro-Winkler distance technique in that the entity resolution system 110 performs processing to check for initials based on the resultant Jaro-Winkler common character counts generated by the Jaro-Winkler distance technique to determine distinctiveness. In certain embodiments, the entity resolution system 110 considers single character initials.

For example, to determine the common character count, a pair of names are compared left-to-right for characters that match and are in the same, relative position in the first name and the second name. These exact character matches are recorded, and a count of common characters is incremented by one each time a character match is found. For example, when comparing JOHN BRIAN SMITH [16 chars] to JOHN SMITH [10 chars], the common character count of 6 is obtained (where spaces are included in the comparison). Next, for any character that has not been matched, the Jaro-Winkler distance technique searches forward and backward in the names for a matching character, up to a configurable search range (i.e., a maximum search range). In certain embodiments, the configurable search range is calculated by dividing the count of all characters and spaces in the longest string by 2 (i.e., "the count of all characters and spaces in the longest string"/2). If there is a matching character within the configurable search range, the match is recorded and the common character count is incremented by one.

From the example above, the configurable search range is 8, and the common character count is incremented by 4 to become 10.

In block 302, the entity resolution system 110 calculates a transposition count. In certain embodiments, all matching characters are evaluated for transpositions. A transposition may be defined as a character match, but the characters are either (a) not in the exact numeric position in the names or (b) not in the same order within the names. In block 302, the entity resolution system 110 counts the number of transpositions. Then, the entity resolution system 110 determines a final transposition count by dividing the calculated transposition count by 2 (i.e., "calculated transposition count"/2).

For this example, the calculated number of transpositions is 1 (integer division of 3⁄2).

At this point, the entity resolution system 110 has generated common character count (i.e., the count of characters that have matches) and a transposition count (i.e., count of the number of transpositions as) follows:

Common character count=10
Transposition Count=1

FIG. 4 illustrates, in a block diagram, a score log from the prototype for the comparison of names in accordance with certain embodiments.

In block 304, the entity resolution system 110 determines that the first name and the second name are similar if the common character count equals a length of the first name (in the pair of names for the entity) and the transposition count is less than a configurable number. In certain embodiments, the configurable number is set to a total number of characters in the shortest, non-initial token in the first name. A token may be described as a word, an initial or other atomic parse element.

In particular, the entity resolution system 110 determines whether the first name is a candidate for being considered non-distinct if all of the characters in the first name have a matching character in the second name (i.e., common character count is equal to the length of the first name) and the transposition count is less than the total number of characters in the shortest, non-initial token in the first name (e.g., there is no token conflict).

Thus, the entity resolution system 110 finds the most distinct one or more names among a group of related names for a single entity before attempting to resolve possibly related entities. The entity resolution system 110 allows for more automatic merging of multiple entity records in those cases in which a name ambiguously matches multiple entity records. The entity resolution system 110 provides a greater number of accurate, automatic decisions on whether to merge entities.

The entity resolution system 110 marks names in a set of names for a first entity to identify non-distinct names, and the remaining names are considered to be distinct names to be used for scoring against another set of names for a second entity. The names in the set may refer to a single entity, including, but not limited to, people, buildings, places, organizations, documents, cars, things, other objects, etc. The set has a plurality of names, which may or may not be unique. Any less complete or less distinct names are not used. The number of names in the final set is not limited in size, but is always at least one.

In certain embodiments, the determination of less complete or less distinct names consists of performing a character comparison between the two names by counting the number of characters between the two names that match in the same position and searching forward and backward in the names for additional matching characters within a configurable search range. Also, the determination consists of evaluating matching characters for transpositions.

The entity resolution system 110 determines that a name for one entity is a candidate non-distinct name if all its characters have a matching character in a second name for the same entity and the number of transpositions is less than a configurable number. The entity resolution system 110 evaluates the candidate non-distinct name for the occurrence of initials. The entity resolution system 110 determines that a candidate non-distinct name is a non-distinct name if it contains no initials. Also, the entity resolution system 110 determines that a candidate non-distinct name is a non-distinct name if the second name contains one or more corresponding initials. The entity resolution system 110 determines that a candidate non-distinct name is a non-distinct name if the second name contains one or more name tokens beginning with the one or more corresponding initials.

Additional Embodiment Details

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, solid state memory, magnetic tape or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the embodiments of the invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational processing (e.g., operations or steps) to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The code implementing the described operations may further be implemented in hardware logic or circuitry (e.g., an integrated circuit chip, Programmable Gate Array (PGA), Application Specific Integrated Circuit (ASIC), etc. The hardware logic may be coupled to a processor to perform operations.

The entity resolution system 110 may be implemented as hardware (e.g., hardware logic or circuitry), software, or a combination of hardware and software.

FIG. 4 illustrates a computer architecture 400 that may be used in accordance with certain embodiments. Computing device 100 may implement computer architecture 400. The computer architecture 400 is suitable for storing and/or executing program code and includes at least one processor 402 coupled directly or indirectly to memory elements 404 through a system bus 420. The memory elements 404 may include local memory employed during actual execution of the program code, bulk storage, and cache memories which provide temporary storage of at least some program code in order to reduce the number of times code must be retrieved from bulk storage during execution. The memory elements 404 include an operating system 405 and one or more computer programs 406.

Input/Output (I/O) devices 412, 414 (including but not limited to keyboards, displays, pointing devices, etc.) may be coupled to the system either directly or through intervening I/O controllers 410.

Network adapters 408 may also be coupled to the system to enable the data processing system to become coupled to other data processing systems or remote printers or storage devices through intervening private or public networks. Modems, cable modem and Ethernet cards are just a few of the currently available types of network adapters 408.

The computer architecture 400 may be coupled to storage 416 (e.g., a non-volatile storage area, such as magnetic disk drives, optical disk drives, a tape drive, etc.). The storage 416 may comprise an internal storage device or an attached or network accessible storage. Computer programs 406 in storage 416 may be loaded into the memory elements 404 and executed by a processor 402 in a manner known in the art.

The computer architecture 400 may include fewer components than illustrated, additional components not illustrated herein, or some combination of the components illustrated and additional components. The computer architecture 400 may comprise any computing device known in the art, such as a mainframe, server, personal computer, workstation, laptop, handheld computer, telephony device, network appliance, virtualization device, storage controller, etc.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of embodiments of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

The foregoing description of embodiments of the invention has been presented for the purposes of illustration and description. It is not intended to be exhaustive or to limit the embodiments to the precise form disclosed. Many modifications and variations are possible in light of the above teaching. It is intended that the scope of the embodiments be limited not by this detailed description, but rather by the claims appended hereto. The above specification, examples and data provide a complete description of the manufacture and use of the composition of the embodiments. Since many embodiments may be made without departing from the spirit and scope of the invention, the embodiments reside in the claims hereinafter appended or any subsequently-filed claims, and their equivalents.

The invention claimed is:

1. A method for identifying non-distinct names in a set of names, comprising:
   obtaining, using a processor of a computer, the set of names for a first entity;
   in response to comparing a first name and a second name in the set of names, determining that the first name is similar to the second name;
   searching for initials in the first name and the second name;
   in response to the search indicating that there is at least one initial in at least one of the first name and the second name,
      determining that the at least one initial matches a corresponding initial in another one of the first name and the second name or that there is a token in one of the first name and the second name that has a matching character in a first position of a corresponding token in the other of the first name and the second name; and
   in response to determining that that the at least one initial matches a corresponding initial in another one of the first name and the second name or that there is a token in one of the first name and the second name that has a matching character in the first position of the corresponding token in the other of the first name and the second name, marking one of the first name and the second name as a non-distinct name; and
   applying a cross-entity scoring technique using distinct names in the set of names for the first entity and names in another set of names for a second entity.

2. The method of claim 1, further comprising:
   in response to the search indicating that there are no initials in the first name and the second name, marking one of the first name and the second name as a non-distinct name.

3. The method of claim 1, wherein the determination that the first name is similar to the second name further comprises:
   calculating a common character count between the first name and the second name;
   calculating a transposition count between the first name and the second name; and
   determining that the first name and the second name are similar if the common character count equals a length of the first name and the transposition count is less than a configurable number.

4. The method of claim 3, further comprising:
   in response to determining that the common character count equals the length of the first name and that the transposition count is less than the configurable number, comparing one or more initial tokens.

5. The method of claim 3, wherein the common character count is based on performing a character comparison between the first name and the second name by moving left-to-right to identify characters that match and are in a same relative position.

6. The method of claim 3, wherein, for any character that has not been matched in the first name, the common character count is based on searching forward and backward within a configurable search range in the first name and the second name to identify matching characters.

7. The method of claim 3, wherein calculating the transposition count further comprises:
   counting a number of transpositions; and
   dividing the counted number of transpositions by two.

8. A computer system for identifying non-distinct names in a set of names, comprising:
   a processor; and
   a storage device connected to the processor,
   wherein the storage device has stored thereon a program, and
   wherein the processor is configured to execute instructions of the program to perform operations, wherein the operations comprise:
      obtaining the set of names for a first entity;
      in response to comparing a first name and a second name in the set of names, determining that the first name is similar to the second name;
      searching for initials in the first name and the second name;
      in response to the search indicating that there is at least one initial in at least one of the first name and the second name,
         determining that the at least one initial matches a corresponding initial in another one of the first name and the second name or that there is a token in one of the first name and the second name that has a matching character in a first position of a corresponding token in the other of the first name and the second name; and
         in response to determining that that the at least one initial matches a corresponding initial in another one of the first name and the second name or that there is a token in one of the first name and the second name that has a matching character in the first position of the corresponding token in the other of the first name and the second name, marking one of the first name and the second name as a non-distinct name; and
      applying a cross-entity scoring technique using distinct names in the set of names for the first entity and names in another set of names for a second entity.

9. The computer system of claim 8, wherein the operations further comprise:
   in response to the search indicating that there are no initials in the first name and the second name, marking one of the first name and the second name as a non-distinct name.

10. The computer system of claim 8, wherein the operations for the determination that the first name is similar to the second name further comprise:
   calculating a common character count between the first name and the second name;
   calculating a transposition count between the first name and the second name; and
   determining that the first name and the second name are similar if the common character count equals a length of the first name and the transposition count is less than a configurable number.

11. The computer system of claim 10, wherein the operations further comprise:
   in response to determining that the common character count equals the length of the first name and that the transposition count is less than the configurable number, comparing one or more initial tokens.

12. The computer system of claim 10, wherein the common character count is based on performing a character comparison between the first name and the second name by moving left-to-right to identify characters that match and are in a same relative position.

13. The computer system of claim 10, wherein, for any character that has not been matched in the first name, the common character count is based on searching forward and backward within a configurable search range in the first name and the second name to identify matching characters.

14. The computer system of claim 10, wherein the operations for calculating the transposition count further comprise:
   counting a number of transpositions; and
   dividing the counted number of transpositions by two.

15. A computer program product for identifying non-distinct names in a set of names, the computer program product comprising:
   a computer readable storage medium having computer readable program code embodied therewith, the computer readable program code comprising:
   computer readable program code, when executed by a processor of a computer, configured to perform:
      obtaining the set of names for a first entity;
      in response to comparing a first name and a second name in the set of names, determining that the first name is similar to the second name;
      searching for initials in the first name and the second name;
      in response to the search indicating that there is at least one initial in at least one of the first name and the second name,
         determining that the at least one initial matches a corresponding initial in another one of the first name and the second name or that there is a token in one of the first name and the second name that has a matching character in a first position of a corresponding token in the other of the first name and the second name; and
      in response to determining that that the at least one initial matches a corresponding initial in another one of the first name and the second name or that there is a token in one of the first name and the second name that has a matching character in the first position of the corresponding token in the other of the first name and the second name, marking one of the first name and the second name as a non-distinct name; and
      applying a cross-entity scoring technique using distinct names in the set of names for the first entity and names in another set of names for a second entity.

16. The computer program product of claim 15, wherein the computer readable program code, when executed by the processor of the computer, is configured to perform:
   in response to the search indicating that there are no initials in the first name and the second name, marking one of the first name and the second name as a non-distinct name.

17. The computer program product of claim 15, wherein, for the determination that the first name is similar to the second name, the computer readable program code, when executed by the processor of the computer, is configured to perform:
   calculating a common character count between the first name and the second name;
   calculating a transposition count between the first name and the second name; and
   determining that the first name and the second name are similar if the common character count equals a length of the first name and the transposition count is less than a configurable number.

18. The computer program product of claim 17, wherein the computer readable program code, when executed by the processor of the computer, is configured to perform:
   in response to determining that the common character count equals the length of the first name and that the transposition count is less than the configurable number, comparing one or more initial tokens.

19. The computer program product of claim 17, wherein the common character count is based on performing a character comparison between the first name and the second name by moving left-to-right to identify characters that match and are in a same relative position.

20. The computer program product of claim 17, wherein, for any character that has not been matched in the first name, the common character count is based on searching forward and backward within a configurable search range in the first name and the second name to identify matching characters.

21. The computer program product of claim 17, wherein, for calculating the transposition count, the computer readable program code, when executed by the processor of the computer, is configured to perform:
   counting a number of transpositions; and
   dividing the counted number of transpositions by two.

* * * * *